March 26, 1935. C. H. HAPGOOD 1,995,611
MILK PUMP
Filed Feb. 23, 1933

WITNESS:
Robt R Kitchel

INVENTOR
Cyrus Howard Hapgood
BY
Busser and Harding
ATTORNEYS.

Patented Mar. 26, 1935

1,995,611

UNITED STATES PATENT OFFICE 1,995,611

MILK PUMP

Cyrus Howard Hapgood, Nutley, N. J., assignor to The De Laval Separator Company, New York, N. Y., a corporation of New Jersey Application February 23, 1933, Serial No. 657,965

2 Claims. (Cl. 103—152)

The object of the invention is to provide a pump which is especially adaptable to the pumping of milk. The milk pumps now in use are open to various objections, such as liability to leakage and to contamination of the milk, the necessity of frequent cleaning and difficulty of efficient cleaning, and the expense of installing and operating the pump. A pump constructed in accordance with my invention is open to none of these objections and may be operated by pneumatic pulsators with which milk producing plants are usually equipped. The pump is especially adapted for use in milk producing plants under conditions which normally exist therein. That is, it is frequently required to pump milk from a locus under (say) 15 inches of vacuum to a locus under about atmospheric pressure and it is convenient to operate the pump by pneumatic pulsations providing high and low pressures of about the same values. The invention is well adapted to such conditions. The invention may be embodied in different forms, one preferred form being shown in the accompanying drawing, wherein—

Figure 1:
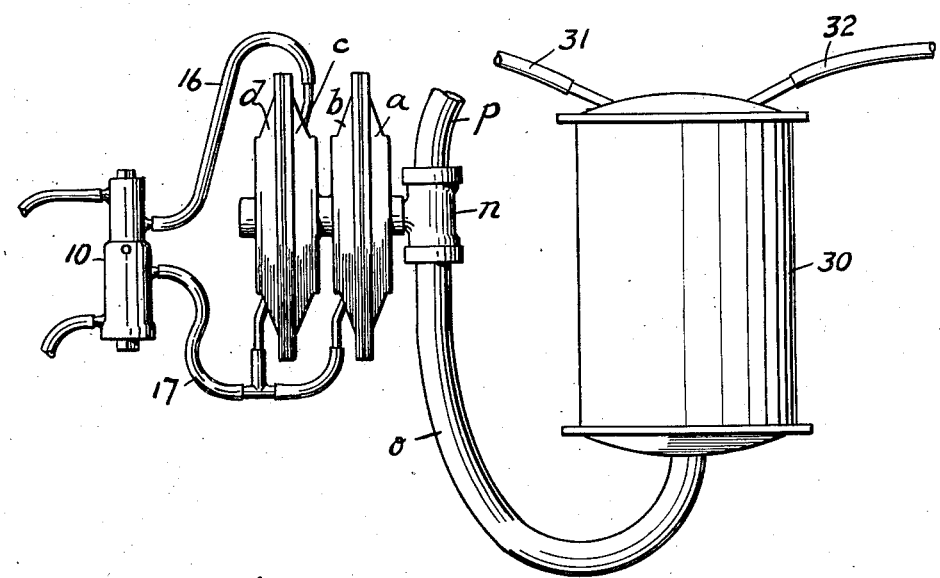
Fig. 1 is an elevational view of my improved pump including the pneumatic pulsator controlling the operation and associated with a milk reservoir from which the milk is to be pumped.

Two pairs of dish-shaped heads $a$, $b$ and $c$, $d$ form the pump casing. The heads $a$ and $b$ of one pair confine between them, around and within their circumferential edges, a diaphragm $e$, of rubber or other flexible material, dividing the space enclosed by the heads into a milk chamber $g$ and an air pulsation chamber $h$. The heads $c$ and $d$ of the other pair confine between them, around and within their circumferential edges, a similar diaphragm $f$ dividing the space enclosed by the heads into two air pulsation chambers $i$ and $j$. The diaphragms $e$ and $f$ are secured, at their centers, to opposite ends of a rod $k$ which is slidable within a hub $m$ connecting heads $b$ and $c$.

Secured to the center of head $a$ so as to communicate with chamber $g$ is a casing $n$ forming an extension or enlargement of the milk chamber of the pump and having a milk inlet and a milk outlet. Secured against the milk inlet, by means of a nut $r$, is the delivery end of a milk supply pipe $o$. The receiving end of a milk discharge pipe $p$ is similarly secured to the milk outlet.

The delivery end of the milk supply pipe $o$ provides a seat for a one-way valve $s$ controlling the admission of milk to casing $n$. The casing $n$ is provided with a web forming a seat for a one-way valve $t$ controlling the discharge of milk from casing $n$. Each valve is provided with guiding wings $v$. The opening movement of valve $s$ is limited by the abutment of its wings against a shoulder on the casing. The opening movement of valve $t$ is limited by the abutment of its wings against the end of discharge pipe $p$.

The heads $b$, $c$ and $d$ are provided with nozzles $w$, $x$ and $y$, respectively.

Positioned at any convenient location is a valve casing 10 provided with a pulsation port 11, an air port 12, a vacuum port 13 and two other ports 14 and 15. Port 14 is connected, through a flexible hose or other conduit 16 with nozzle $x$. Port 15 is similarly connected, through a branching conduit 17, with nozzles $w$ and $y$. Within the valve casing is a reciprocating pulsator valve 20 having end heads of different diameters connected by a stem. The valve has an air port 21 extending from one end through the smaller head to an annular recess 22 in the larger head.

Figure 2:
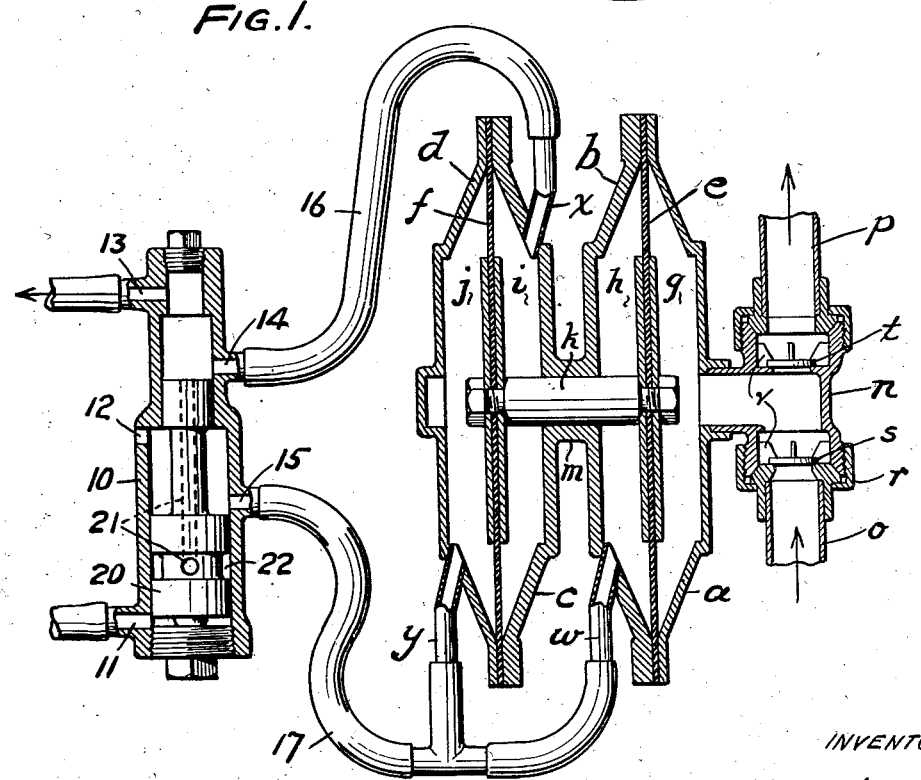
Fig. 2 is an enlarged sectional elevational view of the pump including the controlling pulsator.

When the pulsation port 11 is connected with vacuum, the valve occupies the position shown in Fig. 2. Through air port 12, port 15 and conduit 17, chambers $h$ and $j$ of the pump are connected with atmosphere. Through vacuum port 13, port 14 and conduit 16, chamber $i$ of the pump is connected with vacuum. When the pulsation port 12 is connected with atmosphere, the valve is shifted to a position opposite to that shown and above described. Through air port 12, port 14 and conduit 16, chamber $i$ of the pump is connected with atmosphere; and through vacuum port 13, passage 21, recess 22, port 15 and conduit 17, chambers $h$ and $j$ of the pump are connected with vacuum.

The pipe $o$ for delivering milk to the pump is shown, in Fig. 1, connected with a milk-receiving vessel 30, into which milk from the cow is delivered through pipe 31. Pipe 32 may represent a pipe connected with a source of vacuum.

When the pulsator 20 is in the position shown in Fig. 2 chamber $j$ is under relatively high pressure, conveniently atmospheric pressure, and chamber $i$ is under relatively low pressure, conveniently a vacuum of about 15 inches. Diaphragm $f$ is shifted to the right, thereby also moving rod $k$ and diaphragm $e$ to the right. The milk in chamber $g$ and casing $h$ is thus subjected to pressure, valve $s$ is seated, valve $t$ is unseated and milk is discharged through pipe $p$. Since pipe $p$ is connected with atmosphere, and since chamber $h$ is connected with atmosphere, it will be noted that the pressures in chambers *g* and *h* are balanced and therefore the described unbalanced pressures in chambers *i* and *j* are effective to operate both diaphragms *e* and *f* as described.

When the pulsator is shifted to a position opposite to that shown in Fig. 1, chamber *i* is under pressure and chamber *j* is under vacuum. Diaphragm *f* is moved to the left, thereby moving rod *k* and diaphragm *e* to the left. This operation effects the unseating of valve *s* and the seating of valve *t* and milk is drawn through the delivery pipe *o* into casing *h* and chamber *g*. Since pipe *o* is connected with vacuum, and since chamber *h* is connected with vacuum, it will be noted that the pressures in chambers *g* and *h* are again balanced and therefore the described unbalanced pressures in chambers *i* and *j* are effective to operate both diaphragms *e* and *f* as described.

It is not necessary to the operation of the pump that the higher absolute pressures at port 12 and in pipe *p* should be precisely the same, or that the lower absolute pressures at port 13 and in pipe *o* should be precisely the same. These pressures may differ provided such difference in pressure is less than the difference between the pressure at port 12 and the pressure at port 13.

The pump may be readily disassembled for cleaning.

What I claim and desire to protect by Letters Patent is:

1. A milk pump comprising an enclosure, a flexible diaphragm dividing the enclosure into a milk chamber and an air chamber, a milk supply conduit and a milk discharge conduit communicating with the milk chamber, a second enclosure, another diaphragm dividing the second enclosure into two air chambers, means connecting said diaphragms whereby they move in unison, and means to unbalance the pneumatic pressures in the air chambers of the second enclosure while establishing a relative balance of pressures in the two chambers of the first enclosure, thereby causing milk to be alternately sucked through the milk supply conduit into said milk chamber and discharged from the milk chamber through the milk discharge conduit.

2. A milk pump comprising an enclosure, a flexible diaphragm dividing the enclosure into a milk chamber and an air chamber, a milk supply conduit and a milk discharge conduit communicating with the milk chamber, a second enclosure, another diaphragm dividing the second enclosure into two air chambers, means connecting said diaphragms whereby they move in unison, and means to unbalance the pneumatic pressures in the air chambers of the second enclosure while establishing a relative balance of pressures in the two chambers of the first enclosure, said means comprising pneumatic connections to the three air chambers and a valve movable into one position to connect, through said conduits, one air chamber of each enclosure with a source of higher pressure while connecting the other air chamber of the second enclosure with a source of lower pressure, and movable into another position to reverse said connections.

CYRUS HOWARD HAPGOOD.